2,937,074
Patented May 17, 1960

2,937,074
PROCESS FOR ADSORBING PENTAVALENT VANADIUM VALUES FROM STRONGLY ACID LEACH LIQUORS

Charles S. Abrams, North Brunswick, N.J., assignor to American Cyanamid Company, New York, N.Y., a corporation of Maine No Drawing. Application August 9, 1955
Serial No. 527,402

4 Claims. (Cl. 23—19)

This invention relates to an improved process of adsorbing vanadium compounds from acid leach liquors on anion exchange resins.

Vanadium compounds have been obtained from their ores by leaching with such acids as sulfuric acid to produce a strongly acid leach liquor. This has been particularly the case with ores which contain both vanadium and uranium as the acid leaching is one of the best methods of extracting uranium values from ores. In the case of uranium-vanadium ores, it is customary to treat the acid liquor to adsorb uranium leaving a substantially uranium barren leach liquor containing part or all of the vanadium. Similarly acid leaching of vanadium ores that do not have any recoverable uranium content will produce the same type of acid leach liquor. Attempts have been made in the past to adsorb vanadium in the pentavalent form by anion exchange resins particularly strong base anion exchange resins. These attempts, however, failed in practical operation and have been abandoned. The difficulty encountered which rendered the procedure impractical on a large scale lies in the fact that when acid leach liquors containing vanadium in fair concentration, the order of 2.5–5 g./l., it was necessary to use a somewhat elevated temperature in order to obtain practical outputs. Whenever the higher temperature was used with anion exchange resins conventionally arranged in a series of columns, the column encountering the fresh liquor with the highest vanadium concentration soon plugged up with a precipitated polyvanadate, which is referred to in the art as "red cake." For simplicity, this shorter designation will be used in the remainder of this specification. A plugged resin bed became useless because the red cake cannot be economically and rapidly removed. As a result the adsorption of vanadium on anion exchange resin arranged in beds was formerly economically impractical.

In the past adsorption on ion exchange resins from acidic ore pulp and acid leach liquor, the so-called resin-in-pulp process, has achieved considerable commercial success in the recovery of uranium. The problem of red cake precipitation would be expected to be even more serious in a resin-in-pulp process because the precipitate would be lost with the pulp, whereas in a resin bed process, at least it is available in concentrated space even though its recovery is at the present time prohibitively costly.

The present invention depends on a surprising discovery. When a resin-in-pulp process is used with pulp containing an acid leach liquor and a concentration of vanadium which resulted in red cake precipitate in a resin bed at practical operating temperatures, no precipitation occurs. In other words, it is possible to adsorb vanadium by anion exchange resin in a pulp containing vanadium in the leach liquor at the same concentration which gives trouble in columns and at the same temperature, 50–70° C., which permits rapid adsorption.

By means of the present invention it is possible to obtain good vanadium adsorptions without significant losses from red cake precipitation and the process proceeds smoothly and easily. It is another advantage of the present invention that any of the standard operating techniques used in resin-in-pulp processes may be employed here. No new techniques need be learned. Thus, for example, a series of cells may be used with submerged vertical screens with resin beads having a rapid flow of liquid over the screen at a flat angle which are described and claimed in the copending application of David Kaufman and George W. Lower, Ser. No. 441,356, filed July 6, 1954, now Patent No. 2,808,928. Apparently the improved results which are obtained with the present invention depend on the use of relatively large resin particles which can be retained on a screen of 20 mesh and which can be distributed uniformly throughout the volume of the material from which vanadium is adsorbed because if a typical cell suitable for resin-in-pulp operations is used, for example a cell of the type described in the aforementioned application, the same satisfactory results are obtained if the resin beads are contacted with clear leach liquor which has been separated from the pulp by conventional means. In other words, the present invention depends for its effectiveness on the contact of relatively large resin particles with a fairly large volume of the liquor or pulp containing the vanadium with suitable agitation and having sufficient time to permit satisfactory adsorption at the elevated temperature which permits satisfactory outputs. In neither case is there any noticeable precipitation of red cake.

When the resin-in-pulp process is used, which normally means a series of cells or a series of adsorption stages, it is ordinarily desirable to carry out the whole adsorption cycle from pulp because for mechanical reasons if the equipment is used that would handle resin in pulp, there is no point in wasting money in effecting a liquid-solid separation for most of the cycles. It is, of course, possible to proceed in this manner because the red cake precipitation is encountered only when the vanadium concentration is fairly high. In the case of operations with leach liquor, it is only necessary that the adsorption onto the relatively large resin beads be effected for one or more stages until the vanadium content has been brought down below the level at which red cake precipitation becomes a problem in column work. Thereafter, the partially exhausted leach liquor may be adsorbed in columns if this is desired. Preferably, however, even in the case of operation with leach liquor the whole adsorption cycle is effected with relatively large resin particles such as beads.

It is an advantage of the present invention that the conditions other than the contacting of the vanadium bearing material with the resin are not changed. As has been pointed out above, the temperature range for maximum adsorption remains the same and the same pH considerations apply, that is to say the pH must be prevented from rising too high, i.e. as high as 2. Otherwise a precipitation of insoluble vanadium compounds will take place. The lower limit of pH is approximately 1.3, as below this pH there is a tendency to transform the vanadium compounds at least partially into products containing vanadium as the cations which are not adsorbable. It should be noted that the pH range given above which is not different from that required in column operation is mentioned at room temperature. In the actual adsorbing system at the higher temperature the customary thermal effects will be noted, which means that when measured in the hot pulp, the pH would be slightly higher. Throughout the specification when pH is referred to, it is the pH measured at room temperature.

The invention will be described in greater detail in conjunction with the following specific examples.

Example I

A series of 14 cells provided with vertical screens and with means for directing a rapid substantially vertical flow of liquid and air bubbles over the screen were set up. These cells are of the type described in the above-referred to application of Kaufman and Lower. Each cell contained +20 mesh strong base anion resin of the quaternary ammonium polystyrene-divinyl benzene type described in U.S. Patent No. 2,591,573, and sold by Rohm and Haas under the designation XE-123, the volume of resin being about one fifth of that of the cell. A sulfuric acid leach liquor of pH 1.5 was used. The operation was continuous, running six cells in series for adsorption, six for elution and two in standby condition. When the first cell of the adsorption cycle has reached maximum loading, it is cut out, a fresh cell cut in at the end and the feed transferred to the second cell. This continues until the resin in six cells is fully loaded with vanadium when a conventional elution cycle is started. This elution cycle is conventional, using sulfurous acid and as the invention is not concerned with this elution cycle, it will not be described in greater detail. The concentration of the leach liquor used varied slightly from cycle to cycle as this was obtained from a practical ore. The following table shows the metallurgical results of 13 cycles together with their average.

| Cycle No. | Head, g. $V_2O_5$/l. | Barren, g. $V_2O_5$/l. | Percent Recovery |
| --- | --- | --- | --- |
| 1 | 5.0 | 0.26 | 94.8 |
| 2 | 5.0 | 0.38 | 92.4 |
| 3 | 5.0 | 0.50 | 90.0 |
| 4 | 5.0 | 0.53 | 89.4 |
| 5 | 5.0 | 0.40 | 92.0 |
| 6 | 5.0 | 0.44 | 91.2 |
| 7 | 5.0 | 0.44 | 91.2 |
| 8 | 5.0 | 0.48 | 90.4 |
| 9 | 3.8 | 0.41 | 89.2 |
| 10 | 3.8 | 0.27 | 92.9 |
| 11 | 3.9 | 0.29 | 92.8 |
| 12 | 3.8 | 0.29 | 92.4 |
| 13 | 3.8 | 0.40 | 89.5 |
| Average | 4.5 | 0.39 | 91.3 |

The above 13 cycles were carried out under conditions which assured that all of the vanadium in the leach liquor was in the pentavalent form. This was effected by adding sufficient sodium chlorate to prevent the formation of any reduced vanadium compounds. The residence in each cell of the string of six was 60 minutes, and cell temperature was maintained at 55° C.

Example II

The procedure of Example 1 was repeated with a somewhat higher grade leach liquor. A very high loading of 140 grams of $V_2O_5$ per liter of wet settled resin was obtained. The results are shown in the following table.

| Cycle No. | Head, g. $V_2O_5$/l. | Barren, g. $V_2O_5$/l. | Percent Recovery |
| --- | --- | --- | --- |
| 1 | 6.2 | 0.18 | 97.1 |
| 2 | 6.1 | 0.24 | 96.0 |
| 3 | 6.0 | 0.27 | 95.5 |
| 4 | 6.1 | 0.55 | 91.0 |
| 5 | 6.6 | 0.61 | 90.8 |
| 6 | 7.0 | 0.62 | 91.1 |
| 7 | 5.7 | 0.60 | 89.4 |
| 8 | 6.1 | 0.55 | 90.9 |
| 9 | 6.1 | 0.42 | 93.1 |
| 10 | 6.1 | 0.47 | 92.3 |
| 11 | 6.0 | 0.53 | 91.1 |
| 12 | 6.1 | 0.41 | 93.2 |
| 13 | 6.3 | 0.51 | 91.9 |
| 14 | 6.2 | 0.51 | 91.8 |
| 15 | 6.5 | 0.45 | 93.0 |
| 16 | 7.0 | 0.54 | 92.3 |
| 17 | 6.1 | 0.45 | 92.7 |
| 18 | 5.5 | 0.38 | 93.1 |
| Average | 6.2 | 0.46 | 92.6 |

Example III

The procedure of Examples 1 and 2 was repeated with an ore pulp in contact with the acid liquor. The percentage of solids was 9% and sands larger than the openings in the screens were removed by classification. A loading of 82 grams $V_2O_5$ per liter of wet settled resin was obtained. The results are shown in the following table.

| Cycle No. | Head, g. $V_2O_5$/l. | Barren, g. $V_2O_5$/l. | Percent Recovery | Vanadium Content of Pulp Solids | |
| --- | --- | --- | --- | --- | --- |
| | | | | Head, Percent $V_2O_5$ | Tails, Percent $V_2O_5$ |
| 1 | 2.04 | 0.23 | 88.7 | 0.51 | 0.46 |
| 2 | 2.16 | 0.38 | 82.4 | 0.51 | 0.55 |
| 3 | 2.35 | 0.32 | 86.4 | 0.51 | 0.52 |
| 4 | 2.20 | 0.33 | 85.0 | 0.52 | 0.54 |
| 5 | 2.25 | 0.30 | 86.7 | 0.52 | 0.53 |
| Average | 2.20 | 0.31 | 85.9 | 0.51 | 0.52 |

I claim:

1. A process for adsorbing pentavalent vanadium values from a strongly acid leach liquor bearing said values and having a concentration of the vanadium values sufficiently high so that when contacted with fixed anion exchange resin beds at 50–70° C. precipitation of insoluble polyvanadates takes place, which comprises contacting with agitation anion exchange resin particles which are retained on a 20 mesh screen with said leach liquor at temperatures of 50–70° C., and continuing the adsorption on the resin particles until the concentration of vanadium values in the leach liquor drops below that at which insoluble polyvanadates precipitate in a quiescent fixed resin bed at 50–70° C.

2. A process according to claim 1 in which the leach liquor after adsorption of the vanadium values by the resin particles is separated therefrom and is then contacted with fixed quiescent anion exchange resin beds to adsorb the remaining vanadium values thereof.

3. A process according to claim 1 in which the adsorption of the vanadium values from the leach liquor is effected in a plurality of contacts with successive portions of the anion exchange resin particles with agitation until the leach liquor is substantially exhausted of vanadium values.

4. A process according to claim 3 in which the leach liquor also contains finely ground, leached ore particles suspended therein and the said leached ore particles are separated by screening from each portion of the resin particles.

References Cited in the file of this patent

UNITED STATES PATENTS

| | | |
| --- | --- | --- |
| 2,648,601 | Byler et al. | Aug. 11, 1953 |
| 2,671,035 | Bergman | Mar. 2, 1954 |
| 2,756,122 | McLean | July 24, 1956 |

OTHER REFERENCES

McLean et al. in U.S. Atomic Energy Commission, publication ACCO–63, July 30, 1954 (note especially pp. 47 and 48).

Abrams et al. in U.S. Atomic Energy Commission, publication ACCO–53, July 10, 1954 (especially page 6).

Salmon et al.: "Journal of the Chemical Society" (1952), pp. 2324–2326.

Sussman et al.: "Industrial and Engineering Chemistry," vol. 37, No. 7, pp. 618–624.